(12) United States Patent
Brennan

(10) Patent No.: US 6,394,480 B1
(45) Date of Patent: May 28, 2002

(54) ANTI-COUPLING DEVICE FOR SEMI-TRAILER

(76) Inventor: Victoria Brennan, 30 Golf View Drive, Brampton, Ontario (CA), L6W 1A5

( * ) Notice: Subject to any disclaimer, the term of this patent is extended or adjusted under 35 U.S.C. 154(b) by 0 days.

(21) Appl. No.: 09/661,128

(22) Filed: Sep. 13, 2000

(51) Int. Cl.⁷ .............................................. B60R 25/00
(52) U.S. Cl. ........................ 280/432; 280/507; 70/232
(58) Field of Search ................................ 280/432, 507; 70/14, 232

(56) References Cited

U.S. PATENT DOCUMENTS

| | | | | |
|---|---|---|---|---|
| 3,647,243 A | * | 3/1972 | Nagy et al. ................... | 280/433 |
| 4,039,202 A | | 8/1977 | Bamettler .................... | 280/507 |
| 4,614,357 A | * | 9/1986 | Murray ........................ | 280/507 |
| 4,730,468 A | * | 3/1988 | Becker ......................... | 70/34 |
| 4,882,921 A | * | 11/1989 | Wopinski ..................... | 70/232 |
| 5,136,863 A | * | 8/1992 | Richardson ................... | 70/14 |
| 5,259,223 A | | 11/1993 | Nee ............................. | 70/232 |
| 5,351,511 A | | 10/1994 | Bernier ........................ | 70/232 |
| 5,491,992 A | * | 2/1996 | Mandall ....................... | 70/232 |
| 5,987,938 A | | 11/1999 | Frei .............................. | 70/14 |
| 6,070,688 A | * | 6/2000 | Schulz ......................... | 180/287 |

* cited by examiner

Primary Examiner—J. J. Swann
Assistant Examiner—L. Lum
(74) Attorney, Agent, or Firm—Eugene J. A. Gierczak

(57) ABSTRACT

An anti-coupling device for a semi-trailer to prevent the coupling of a semi-trailer's kingpin to a tractor's fifth wheel comprising of a housing assembly mounted within a specific radius of the kingpin having a half sphere for engaging the tractor's fifth wheel when the half sphere is locked in an active position by a locking assembly. The anti-coupling device may move between an active and a passive position by pneumatic valve system.

19 Claims, 9 Drawing Sheets

ANTI-COUPLING DEVICE FOR SEMI-TRAILER

FIELD OF THE INVENTION

This invention relates in general to an anti-theft device for a semi-trailer and more particularly to anti-coupling device for a semi-trailer to prevent the coupling of a semi-trailer's kingpin to a tractor's fifth wheel.

BACKGROUND OF THE INVENTION

There are numerous anti-theft devices that attempt to stop the theft of trailers, cars, trucks and semi-trailers. Thefts of semi-trailers, which are attached to the tractors, have become quite prevalent, as tractor-trailers are the most common form of transportation for a wide variety of goods. In particular the pharmaceutical, electronic, cigarette and machine industries have been targets for many of these thefts as these goods are costly and have a high resale value. The cost of these thefts affects the manufactures and the end consumer, as the thefts require police and insurance investigations as well as the replacement costs for the stolen goods.

The trucking industry has tried to develop different devices and methods to stop these thefts. For example, global positioning systems (GPS) for tracking the tractors and the trailers have been installed but often by the time the trailer is tracked the goods have been unloaded. In general the thief is interested in moving the trailer only a relatively short distance to allow them to quickly off load the goods inside the trailer. Therefore it is important for the thief to be able to quickly connect to the trailer to move it.

In general the coupling of the tractor to the trailer requires a flush, secure contact between the trailer's bolster plate located at the front of the trailer and the tractor's fifth wheel at a point of articulation. The kingpin located on the bolster plate of the trailer is usually the point of articulation, which helps the control the forward motion of the trailer during braking.

Other examples of anti-theft security measures for semi-trailers are as follows. The parking security method requires that the semi-trailers be parked in such a manner so as to prevent easy coupling. This is achieved by parking a row of trailers tightly side by side with each trailer positioned several feet ahead of the preceding vehicle therefore limiting access to the kingpins. Unfortunately, this method is reliant on the fleet personnel to ensure that this scheme is carried out and often requires a great deal of time and can be inconvenient.

Another example, is the kingpin lock which is attached to the kingpin after it has been parked. In general, these locks encircle the kingpin preventing the tractor's fifth wheel from locking on to the kingpin. This padlock type device usually requires a key and may be easily overcome for instance, by cutting the padlock off.

Prior art anti-theft devices have been devised to address some of the aforenoted problems. For example, U.S. Pat. No. 4,614,357 issued on Sep. 30, 1986 to Murray. This patent relates to when the air brake line on a semi-trailer is disconnected, and a plunger is thrust down through the semi-trailer bottom plate to obstruct access to the semi-trailer hitch pin. Reconnection of the air brake line withdraws the plunger.

Bamettler is the owner of U.S. Pat. No. 4,039,202, which issued on Aug. 2, 1977. This patent relates to a pair of plates, rotatably joined together on the underside of a trailer or semi-trailer, which in the latched position enclose the trailer pin so as to prevent a tractor from being joined to the fifth wheel of a tractor. The plates, when in the latch position, may be fastened by key locking or other latching means. Opening of the plates permits access of a tractor fifth wheel to the trailer pin.

Frei is the owner of U.S. Pat. No. 5,987,938, which issued on Nov. 23, 1999. This patent relates to a trailer kingpin locking apparatus, which features a lock body with a cylindrical opening to receive a kingpin. A padlock channel, running transversely to the axis of the kingpin opening and sized to accommodate the body of a padlock, extends partially into the sidewall of the lock body.

Bernier is the owner of U.S. Pat. No. 5,351,511, which issued on Oct. 4, 1994. This patent relates the locking device which includes a housing defining a towing element receptacle, an engaging element having an engaging portion and an actuating portion for selectively engaging a towing element disposed within the towing element receptacle, a locking compartment adapted to house the actuating portion of the engaging element, a locking compartment cover, an actuating tool coupled to the locking compartment cover and adapted to cooperate with the actuating portion of the engaging element, a locking chamber for receiving the actuating tool when the locking compartment cover is in a closed position, and a lock for selectively locking the actuating tool within the locking chamber and locking the cover in place.

Nee is the owner of U.S. Pat. No. 5,259,223, which issued on Nov. 9, 1993. This patent relates to a kingpin security device preferably having a semi-circular plate transverse to a flat base. The plate has a channel therein which defines a shoulder thereabove such as to form a close fit with the annular recess and annular lip found on a standard kingpin. After the kingpin security device is affixed to a kingpin, a standard padlock can be attached to this extending arm.

The prior art devices described above however do not completely stop the creation of an articulation point between the tractor and the trailer and thus may allow for the coupling between the trailer and the tractor by other means such as chains and cables. Furthermore prior art devices are not necessarily built right into the trailer itself and thus have to be manually installed each time the trailer is left unattended. Moreover the lock mechanisms are often left exposed and accessible so that a thief may easily disable the lock mechanism.

Thus an anti-coupling device for a kingpin of a semi-trailer to prevent coupling to a tractor's fifth wheel which is installed within the trailer, provides no point of articulation for coupling between the tractor and the trailer, and may be activated in a number of ways by the user is desirable.

SUMMARY OF THE INVENTION

An object of one aspect of the present invention is to provide an improved anti-coupling device for a kingpin of a semi-trailer to prevent coupling to a tractor's fifth wheel.

In accordance with the first embodiment of the present invention there is provided an anti-coupling device for a semi-trailer to prevent the coupling of a semi-trailer's kingpin to a tractor's fifth wheel. The anti-coupling device may comprise of a housing assembly mounted within the semi-trailer within a specific radius of the kingpin. Conveniently, the housing assembly may include an engaging means for engaging the tractor's fifth wheel when locked into an active position by a locking means. The engaging means may force the semi-trailer to ride-up across the fifth wheel.

Preferably, the anti-coupling device may move between an active position and a passive position by a means for activating the anti-coupling device. The means for activating the anti-coupling device may be further defined as a biasing system. Conveniently, the anti-coupling device may include a pressure plate engaged by a diaphragm, or by a rod member.

In accordance with another embodiment of the present invention there is provided a method for engaging an anti-coupling device to a semi-trailer to prevent the coupling of a semi-trailer's kingpin to a tractor's fifth wheel. The method may include engaging an engaging means secured within a housing assembly mounted within the semi-trailer within a specific radius of the kingpin using a means for activating the anti-coupling device. The semi-trailer may be forced to ride-up across the tractor's fifth wheel as the engaging means contacts the fifth wheel.

Advantages of the present invention include improved access to the semi-trailer for the operators therefore reducing time and inconvenience, improved security for the semi-trailer as the anti-coupling device can not be easily removed, and prevents movement of the semi-trailer even with chains or cables as it does not allow for a point of articulation to be established.

BRIEF DESCRIPTION OF THE DRAWINGS

A detailed description of the preferred embodiments are provided herein below by way of example only and with reference to the following drawings, in which.

Figure 1:
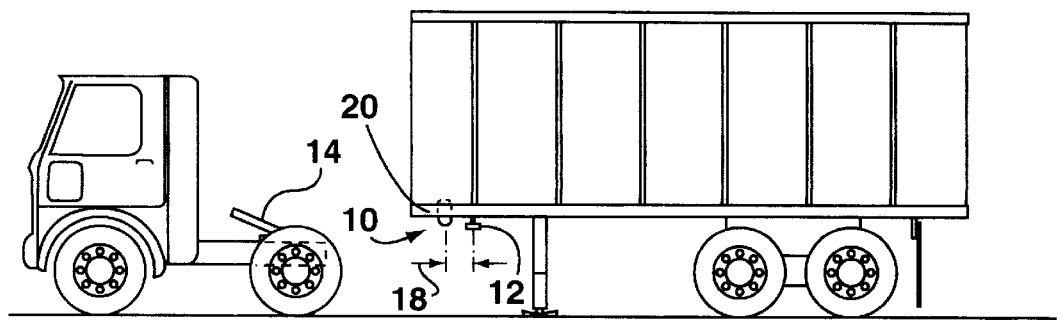
FIG. 1 is a front plan view of the anti-coupling device for a semi-trailer in its environment.

In the drawings, preferred embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENTS

Figure 2:
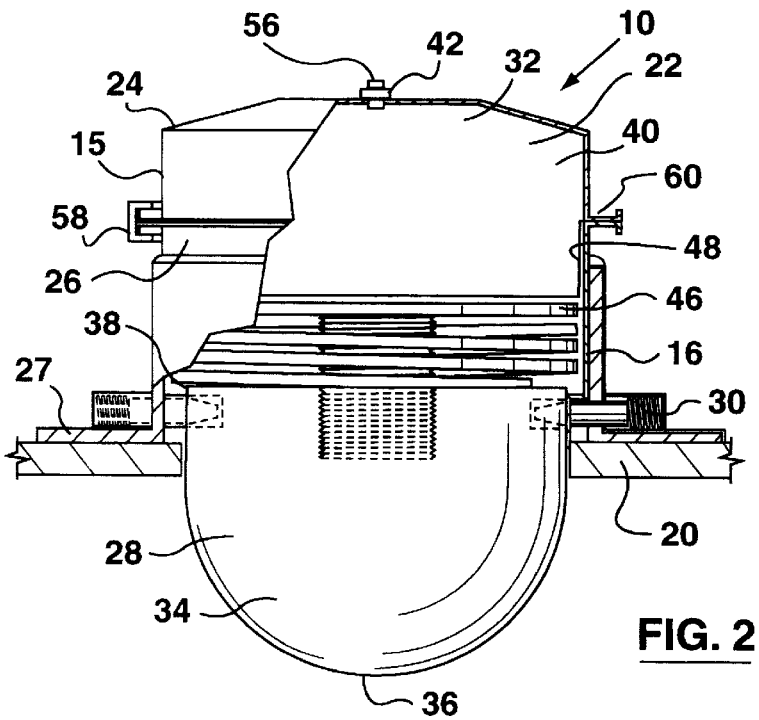
FIG. 2 is a partial cross-sectional view of a preferred embodiment of the present invention in an active position.

Referring to FIGS. 1 and 2 there is illustrated in front cross-sectional views, an anti-coupling device 10 for a semi-trailer to prevent the coupling of a semi-trailer's kingpin 12 to a tractor's fifth wheel 14 in accordance with the preferred embodiments of the present invention.

Figure 10:
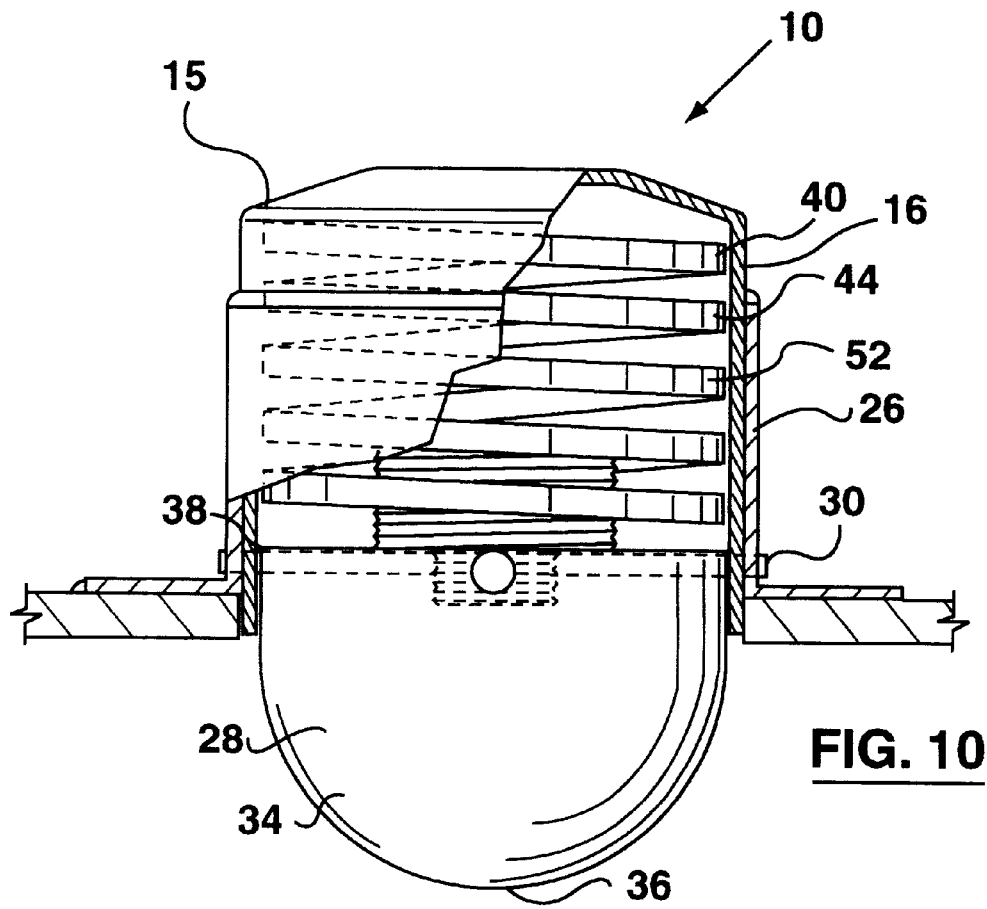
FIG. 10 is a cross-sectional view of a second preferred embodiment in the passive or floating position.

Referring to FIGS. 1, 2 and 10 the anti-coupling device 10 includes a housing assembly 16 that is mounted within a specific radius 18 of the semi-trailer's kingpin 12. The housing assembly 16 may be mounted through the floor of the semi-trailer or more specifically into the bolster plate 20 or skid plate of the semi-trailer from above the bolster plate 20, but under the floor boards and between the frame rails and cross rails of the semi-trailer. When assembled the housing assembly 16 is mounted onto the bolster plate 20, and extends through the bolster plate 20 to sit flush with the contact surface of the bolster plate 20. Therefore once installed, nothing protrudes beyond the bolster plate 20 so that there is no interference with bolster plate 20 during the mating between the kingpin 12 and the fifth wheel 14. The housing assembly 16 may be secured to the bolster plate 20 using a flanged mounting ring 27. The anti-coupling device 10 may be mounted within a specific radius from the kingpin's 12 center line. More specifically the anti-coupling device 10 must be mounted at a point within the radius that the kingpin 12 contacts the fifth wheel 14.

The housing assembly 16 further comprises an engaging means 28 mounted within the housing assembly 16. The engaging means 28 may move between an active position and a passive position by a means for activating the anti-coupling device 32. The engaging means 28 may be locked into the active position using a locking means 30 that is mounted on the outside of the housing assembly 16 and can pass through openings in the housing assembly 16 to engage the engaging means 28. In the active position, the engaging means 28 may engage the tractor's fifth wheel 14 and force the semi-trailer to ride-up across the fifth wheel 14.

The engaging means 28 may be further defined as a half sphere 34, ball or piston that is made from forged or cast steel. In general the half sphere 34 includes a curved end 36 for engaging or contacting the fifth wheel 14 and a flat end 38 adapted for mounting to the housing assembly 16. The half sphere 34 may include grooves or indentations to receive the locking means 30 after it passes through the openings in the housing assembly 16 to the half sphere 34 when the anti-coupling device 10 is in the active position.

The half sphere 34 may move between the active and passive positions by the means for activating the anti-coupling device 32 which may be further defined as a biasing system 40. More specifically the half sphere 34 may be retained within the housing assembly 16 in the passive position by biasing system 40 which may be better defined as a pneumatic system 42 such as an air valve 56, or a spring system 44 such as an expansion spring 52, or a combination of both.

Figure 3:
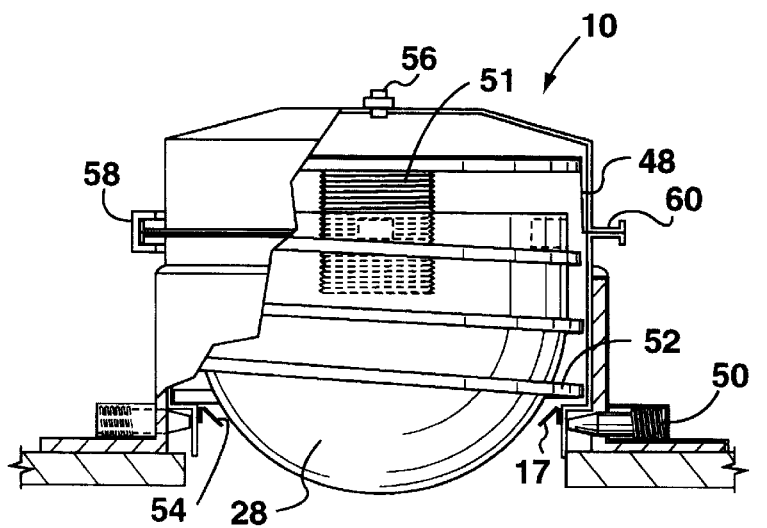
FIG. 3 is a partial cross-sectional view of the preferred embodiment shown in FIG. 2 in a passive position.
Figure 4:
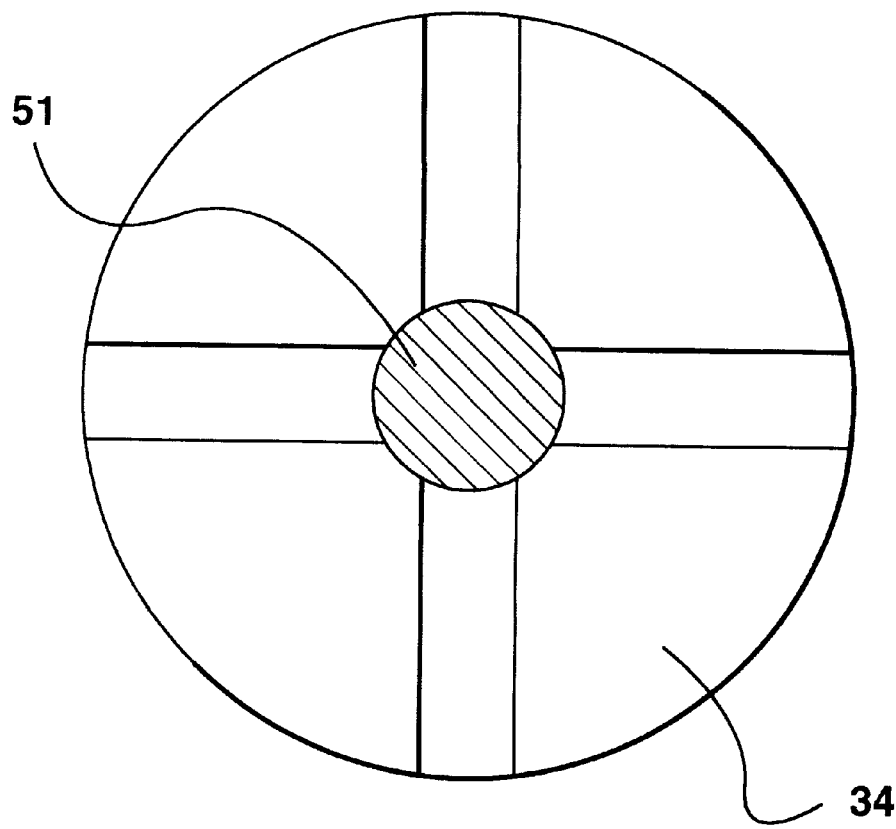
FIG. 4 is a cross-sectional view of the half sphere of the preferred embodiment shown in FIG. 2.
Figure 5:
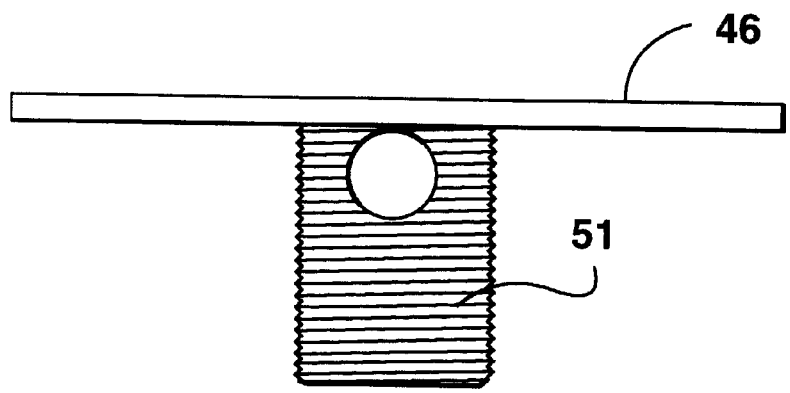
FIG. 5 is a front plan view of the threaded pin and pressure plate of the preferred embodiment shown in FIG. 2.
Figure 6:
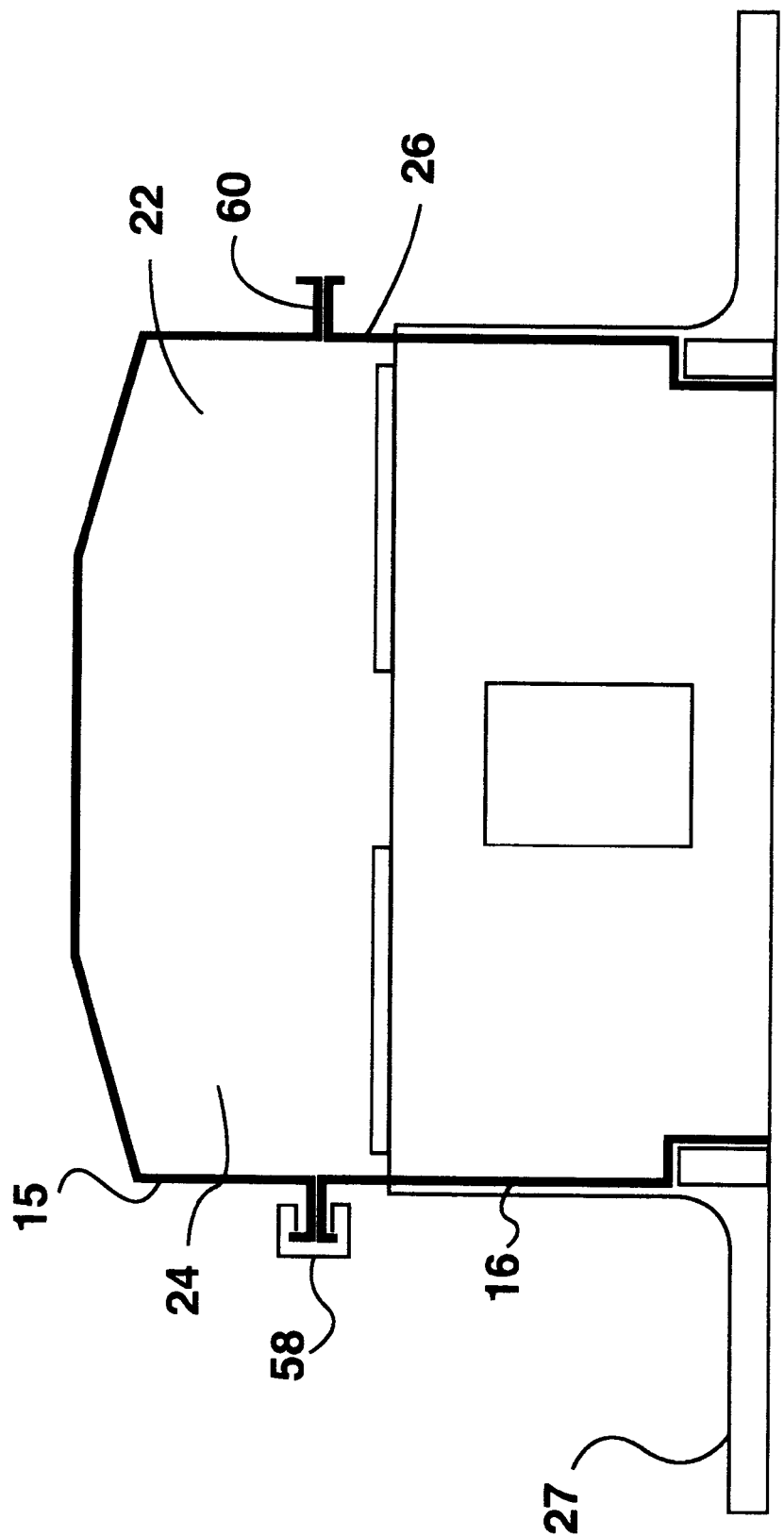
FIG. 6 is a cross-sectional view of the housing assembly of the preferred embodiment shown in FIG. 2.
Figure 7:
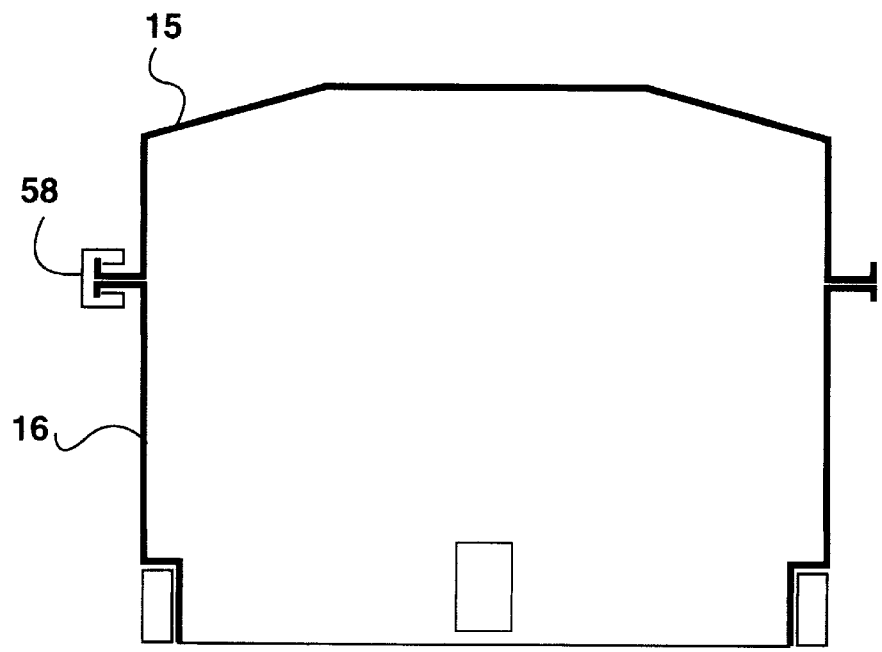
FIG. 7 is a cross-sectional view of the canister of the preferred embodiment shown in FIG. 2.
Figure 8:
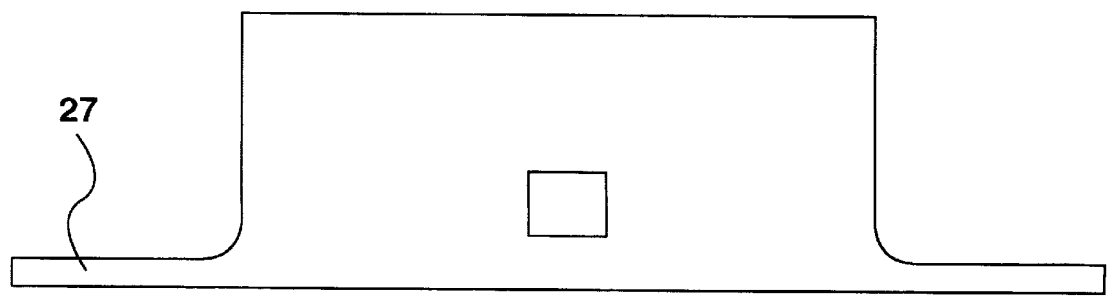
FIG. 8 is a cross-sectional view of the flanged mounting ring of the preferred embodiment shown in FIG. 2.

Referring to FIGS. 2 and 3 for the first preferred embodiment, the housing assembly 16 may further comprise of a pressure plate 46 mounted to the flat end 38 of the half sphere 34 and a diaphragm 48 which expands and engages the pressure plate 46 when the biasing system 40 is activated. In the passive position, the diaphragm 48 collapses, and an expansion spring 52 expands forcing the pressure plate 46 to move the half sphere 34 so that it is retracted into the housing assembly 16. In the active position the half sphere 34 is forced out of the housing assembly 16 and is locked into place by a locking means 30. In the passive position the diaphragm 48 collapses and the pressure plate 46 moves the half sphere 34 so that it is retained within the housing assembly 16.

Referring to FIGS. 4 to 8, the housing assembly 16 may consist of at least one canister 15 and in the first embodiment may be assembled to include an inner housing assembly 22 having an upper portion 24 having and an air valve 56 and a lower canister 26 that are secured together. A combination bushing and seal ring 17 is inserted into the lower canister 26 so as to contact the half sphere 34 when in the active position forming a flange or seal surface 54, which also prevents or limits the entry of contaminating debris into the housing assembly 16. The expansion spring 52 may be placed over the bushing and seal ring 17. The pressure plate 46 may be mounted to the flat end 38 of the half sphere 34 using a threaded pin 51, which the flat end 38 of the half sphere 34 is adapted to receive. The pressure plate 46 with mounted half sphere 34 may be placed into the lower canister 26 to rest on the expansion spring 52.

The diaphragm 48 is placed over the pressure plate 46 to rest evenly around the circumference or edge 60 of the lower canister 26 where the lower canister 26 and upper portion 24 meet and are secured together. The upper portion 24 of the inner housing assembly 22 is then placed on top of the diaphragm 48 and rests evenly against the edge 60 of the lower canister 26. The upper portion 24 and the lower canister 26 are secured together by a clamping ring 58 ensuring an air tight seal.

The housing assembly 16 may now be placed within the flanged mounting ring 27 and positioned so that the inner housing assembly 22 extends beyond the flanged mounting ring 27, but does not exceed the thickness of the semi-trailer's bolster plate 20. Once positioned, the locking mechanism 50 may be aligned with the assembled inner housing assembly 22 so as to allow the locking mechanism 50 such as a pin to move through the holes of the flanged mounting ring 27, the inner housing assembly 22 to secure into the grooves of the half sphere 34.

Finally, an air line may be attached to the air valve 56 on the upper portion 24 using a relay valve and check valve or the like, allowing for a lock-on/off control mechanism (not shown) of the air line.

In accordance with another embodiment of the present invention, there is provided a method for engaging an anti-coupling device 10 to a semi-trailer's kingpin 12 to a tractor's fifth wheel 14.

In operation, the method for engaging the anti-coupling device 10 includes the elements described above. For the activation of the anti-coupling device 10, the lock-on/off control mechanism is activated allowing for compressed air to enter into the anti-coupling device 10. More specifically, the compressed air enters the upper portion 24 of the inner housing assembly 22 and causes the diaphragm 48 to expand and depress against the pressure plate 46. The half sphere 34 is then forced down within the lower canister 26 to a point where the locking mechanism 50 which is spring loaded is engaged and secures the half sphere 34 in the activated position.

To move the half sphere 34 to a passive position, the air lines may be connected to locking mechanism 50 via the relay valve and the lock on/off control mechanism is deactivated. The air pressure stored in the upper housing is then exhausted from the upper portion 24 into the locking mechanism 50 forcing the locking mechanism 50 to be deactivated since the air pressure forces the spring pressure in the locking mechanism 50 back. As the locking mechanism 50 moves away from the half sphere 34, the expansion spring 52 in the inner housing assembly 22 forces the half-sphere 34 to retract into the inner housing assembly 22.

The mechanism of the coupling of the kingpin 12 to the fifth wheel 14 requires that the kingpin 12 lock onto the fifth wheel 14. For the coupling to occur, the fifth wheel 14 must be flat and flush to the bolster plate 20 of the semi-trailer as it approaches the kingpin 12 so that the semi-trailer is lifted as little as possible. The fifth wheel 14 must be properly aligned so that the kingpin 12 is in the horizontal plane to complete the coupling.

In the activated position, the semi-trailer may not couple with the fifth wheel 14 as the half sphere 34 will ride up against the surface of the fifth wheel 14, lifting the semi-trailer's kingpin 12 above and away from the fifth wheel 14 and therefore it cannot lock to the fifth wheel 14. As noted above, because of the placement of the anti-coupling device 10 within the specific radius of kingpin 12, the fifth wheel 14 may not couple with the semi-trailer regardless of angle that the tractor's fifth wheel 14 approaches the kingpin 12. Therefore the point of articulation can not be established and the semi-trailer cannot be properly supported or towed.

Figure 11:
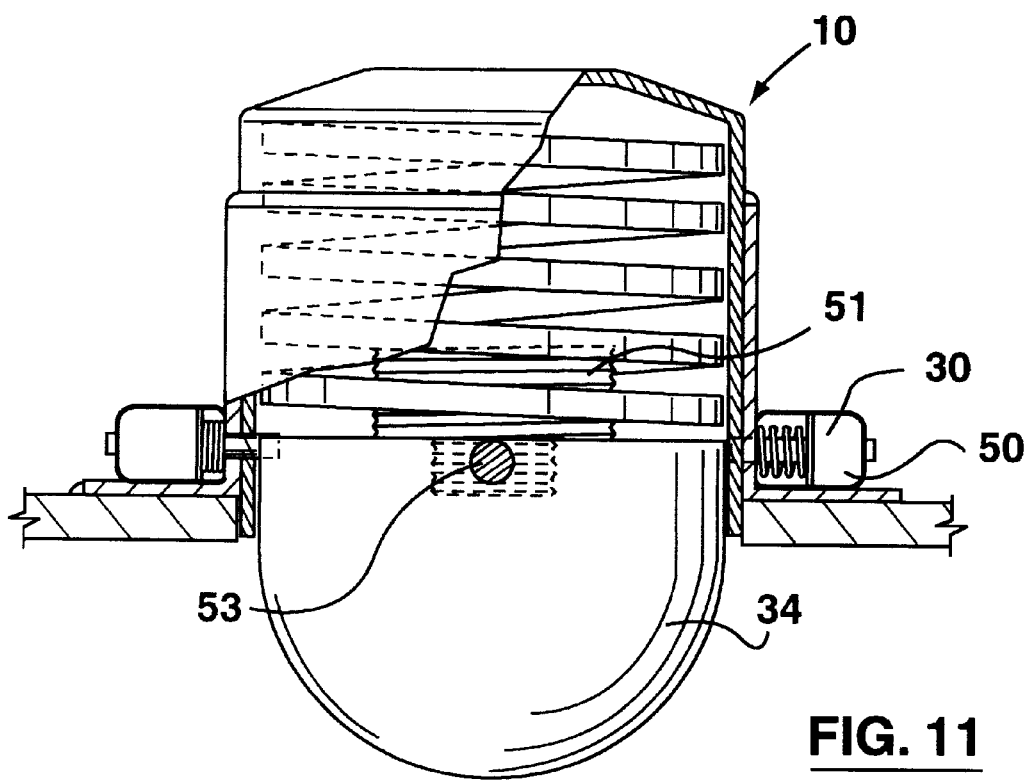
FIG. 11 is a cross-sectional view of the preferred embodiment shown in FIG. 11 in the active position.
Figure 12:
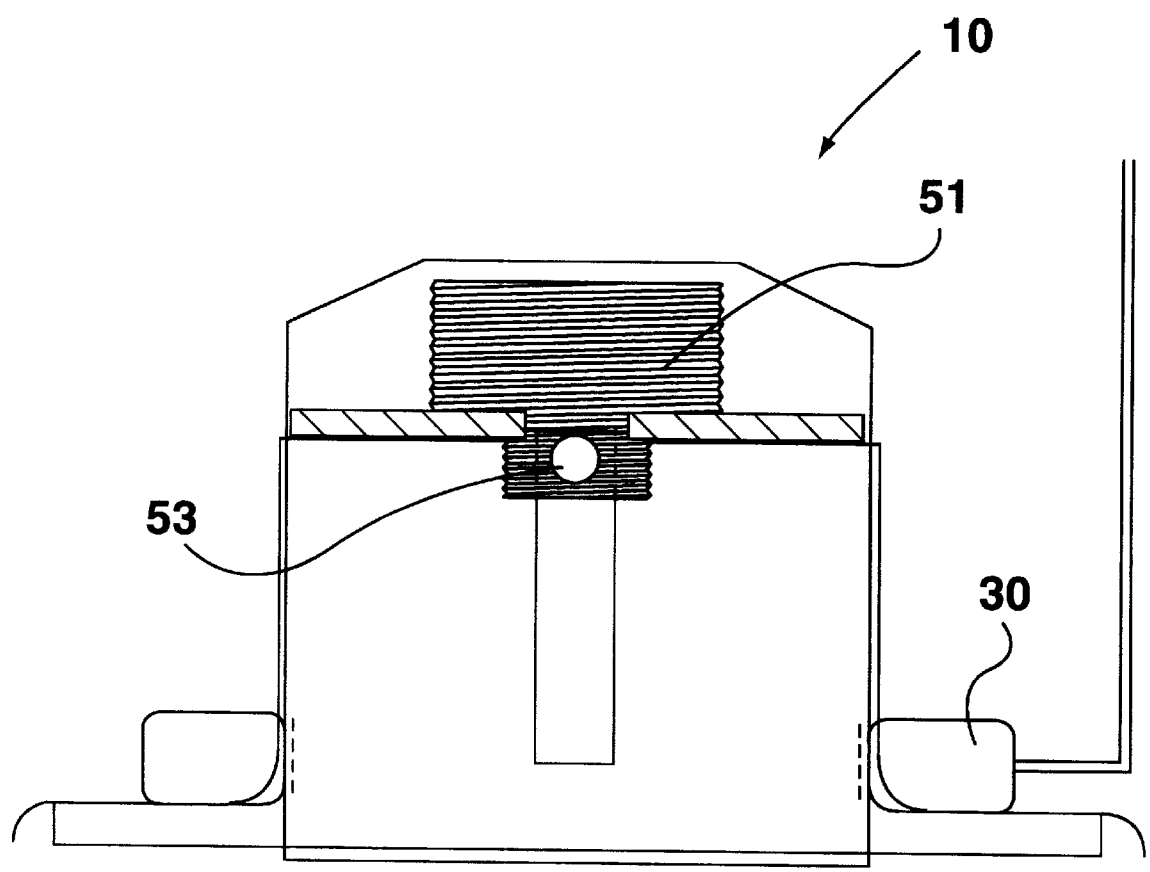
FIG. 12 is a cross-sectional view of the housing assembly of the preferred embodiment shown in FIG. 10.
Figure 13:
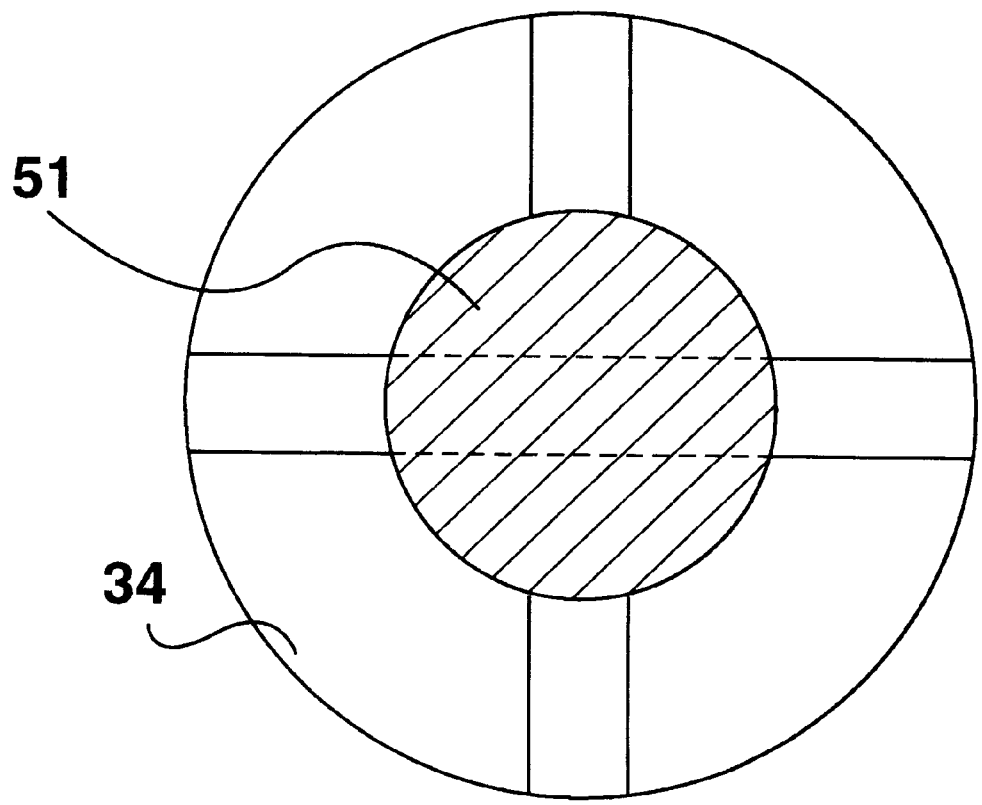
FIG. 13 is a top cross-sectional view of the half sphere of the preferred embodiment shown in FIG. 10.
Figure 14:
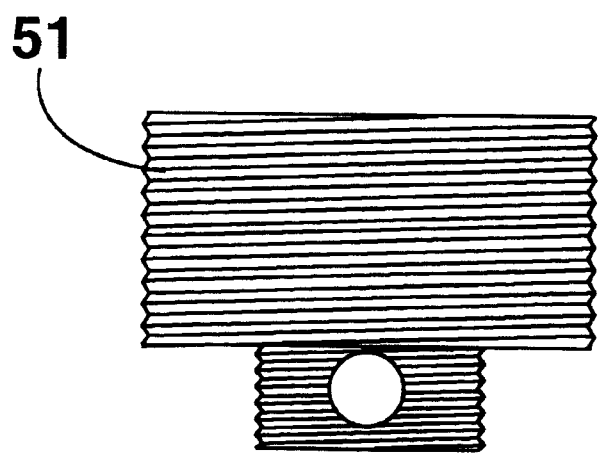
FIG. 14 is a front view of the threaded pin of the preferred embodiment shown in FIG. 10.
Figure 15:
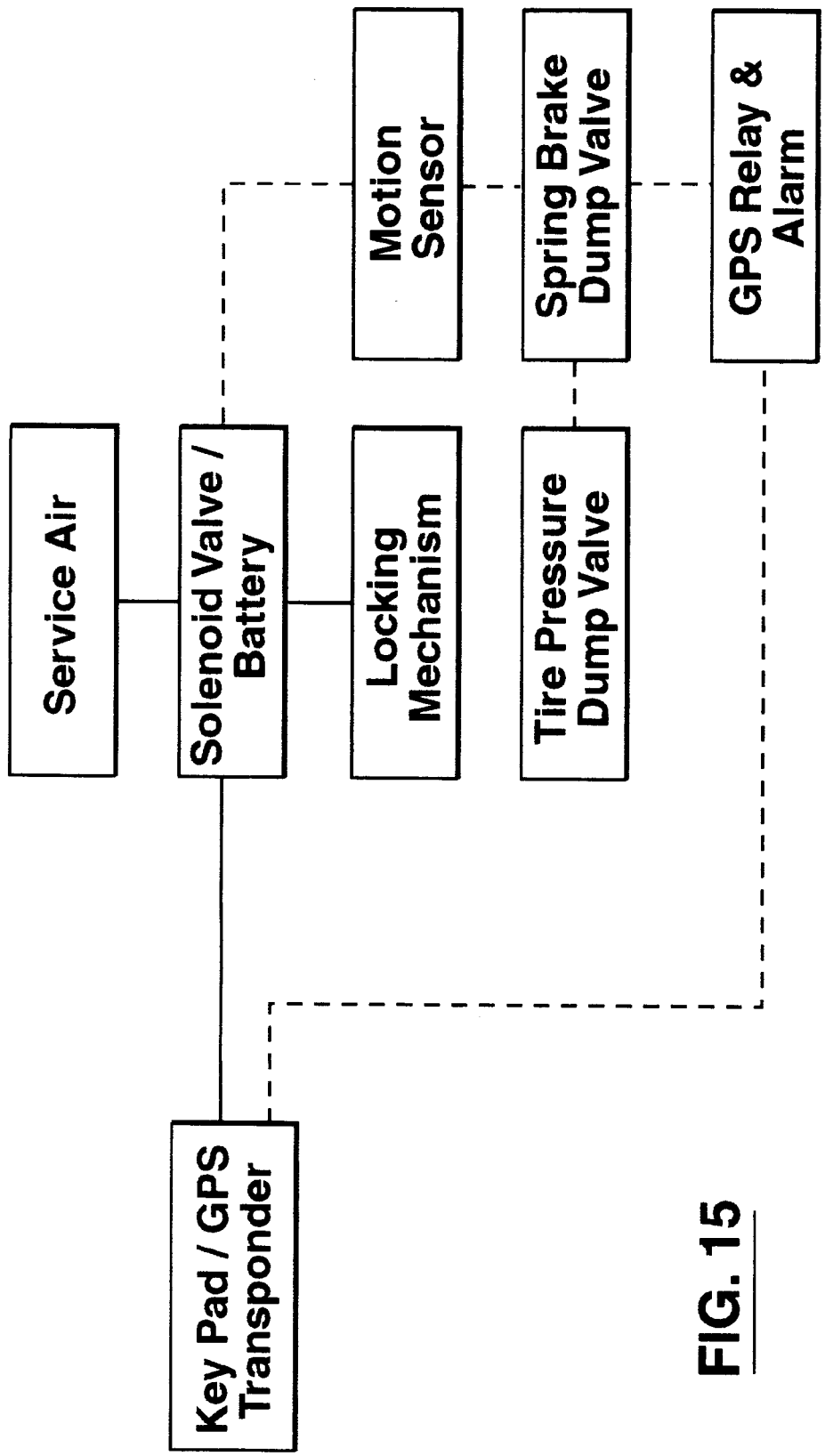
FIG. 15 is a diagram of the activation system for the preferred embodiment shown in FIG. 10.

Referring to FIGS. 10 and 11, in another embodiment of the present invention, in the passive position, the half sphere 34 may "float" up and down within the housing assembly 16 while allowing the kingpin 12 of the semi-trailer to couple successfully with fifth wheel 14 of the tractor. In the active position the half sphere 34 may be locked into that position by a locking means 30 such as a locking mechanism like a lock bar, pin or piston 50. The locking mechanism 50 may be spring loaded or pneumatically activated and passes through holes in the housing assembly 16 to contact the half sphere 34.

The half sphere 34 may be retained in the housing assembly 16 by means of a member and, more particularly, a threaded center pin 51 and a piston stop bar 53. The half sphere 34 may be adapted to accept the treaded center pin 51 that is then retained within the housing assembly 16 by means of the piston stop bar 53. More specifically the piston stop bar 53 may be inserted from the outside of the flanged mounting ring 26 through the inner housing assembly 22 then through the adapted threaded center pin 51. A retainer clip may be used to prevent the piston stop bar 53 from moving.

In the passive position the half sphere 34 may move up and down within the housing assembly 16. In the active position the half sphere is forced down by spring pressure and may be locked down by the activation of the locking mechanism 50.

Figure 9:
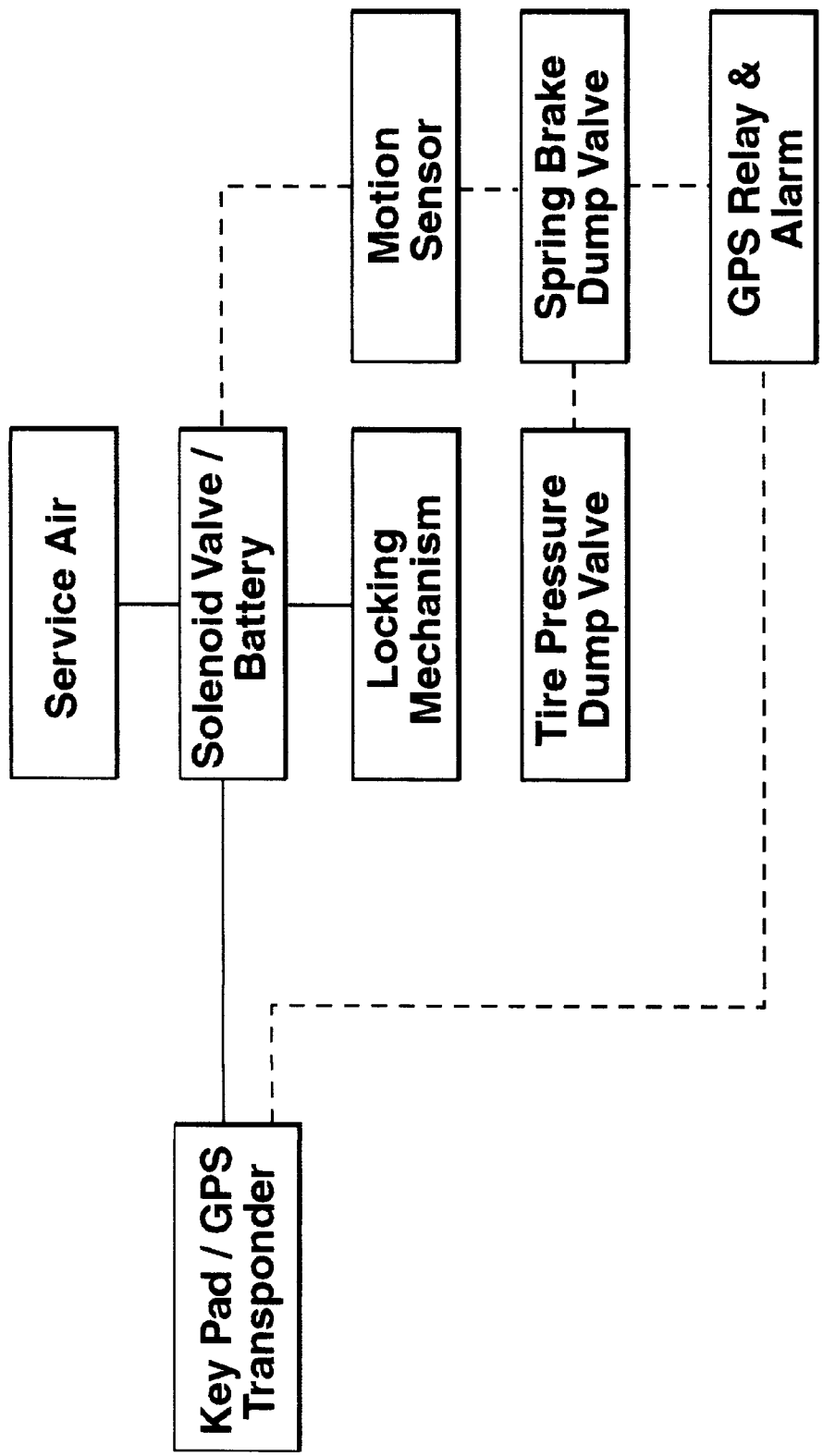
FIG. 9 is a diagram of the activation sequence of the preferred embodiment of the present invention.

Referring to FIGS. 9 and 17 the half sphere 34 may move between the passive position to the active position manually using a pneumatic valve, electronically using a coded keypad and a pneumatic valve system or through remote electronic access in conjunction with the coded keypad and a GPS system. In general the keypad access code may be obtained from the vehicle's dispatcher and may be determined through a computer program. Furthermore remote electronic activation allows for another level of security since it may only be supplied upon proper identification by the tractor trailer operator.

The anti-coupling device 10 may be installed for activation manually, such as a key lock or the like, electronically or by electronic remote. For manual activation, the anti-coupling device requires the installation of the relay valve and the air lines, and the connection of the locking mechanism 50 to the anti-coupling device 10 so that it is controlled by the lock on/off control mechanism at the front outside surface of the semi-trailer.

The anti-coupling device 10 may also be installed for electronic activation which requires the air lines to be connected to an electronic control valve which may be controlled by an battery operated keypad on the outside of the semi-trailer. The anti-coupling device 10 may be activated by remote by including an electronic solenoid valve, which is then connected to the keypad. Furthermore the anti-coupling device 10 may be connected and controlled by a security system linked to motion sensors, electronic solenoid dump valves and GPS transponders. If the anti-coupling device 10 is activated either electronically or remotely, the brake valving on the trailer may also be connected so that if an attempt is made to try and move the semi-trailer without the correct authorization, the keypad board activates a "dump" valve causing the loss of all of the compressed air in the service brake lines effectively immobilizing the trailer. Furthermore a GPS system may be activated so that alarm signals are sent to the controller or dispatcher as well as the activation of strobe alarm lights.

Other variations and modifications of the invention are possible. All such modifications or variations are believed to be within the sphere and scope of the invention as defined by the claims appended hereto.

I claim:

1. An anti-coupling device for a semi-trailer to prevent the coupling in any direction of a semi-trailer's kingpin to a top surface of a tractor's fifth wheel comprising:
   (a) a housing assembly mounted within said semi-trailer within a specific radius to prevent the coupling of said kingpin to said semi-trailer from any direction, having an engaging means for engaging said top surface of said tractor's fifth wheel thereby deflecting said semi-trailer upward and across said top surface of said fifth wheel when said engaging means is locked in an active position by a locking means; and
   (b) a means for activating said anti-coupling device between said active position and a passive position.

2. An anti-coupling device for a semi-trailer as claimed in claim 1 wherein said means for activating said anti-coupling device is biasing system within said semi-trailer.

3. An anti-coupling device for a semi-trailer as claimed in claim 2 wherein said method for activating said biasing system is selected from a group consisting of manual activation, electronic activation, and remote electronic activation.

4. An anti-coupling device for a semi-trailer as claimed in claim 2 wherein said engaging means is a half sphere having a curved end and a flat end adapted for mounting to said housing assembly.

5. An anti-coupling device for a semi-trailer as claimed in claim 4 wherein said biasing system is a pneumatic system applying direct air pressure to activate said anti-coupling device.

6. An anti-coupling device for a semi-trailer as claimed in claim 5 wherein said biasing system is a spring system applying direct spring pressure to deactivate said anti-coupling device.

7. An anti-coupling device for a semi-trailer as claimed in claim 6 further comprising a member for securing said half sphere to said housing assembly.

8. An anti-coupling device for a semi-trailer as claimed in claim 7 wherein said locking means is a spring loaded locking pin assembly for engaging said half sphere in said active position.

9. An anti-coupling device for a semi to prevent the coupling of a semi-trailer's kingpin to a tractors fifth wheel comprising:
   (a) a housing assembly mounted within said semi-trailer within a specific radius of said kingpin having a half sphere having a curved end and a flat end adopted for mounting to said housing assembly, for engaging said tractor's fifth wheel thereby deflecting said semi-trailer upward and across said fifth wheel when said engaging means is locked in an active position;
   (b) a pneumatic system for activating said anti-coupling device between said active position and a passive positions
   (c) a pressure plate for receiving and securing said flat end of said half sphere; and
   (d) a diaphragm for engaging said pressure plate and moving said pressure plate and said secured half sphere to said active position by said pneumatic system.

10. An anti-coupling device for a semi-trailer as claimed in claim 9 wherein said locking means is a spring loaded locking pin assembly for engaging said half sphere in said active position.

11. A method for engaging an anti-coupling device to a semi-trailer to prevent the coupling from any direction of a semi-trailer's kingpin to a top surface of a tractor's fifth wheel comprising:
   (a) engaging an engaging means secured within a housing assembly mounted within said semi-trailer within a specific radius of said kingpin using a means for activating said anti-coupling device;
   (b) deflecting said semi-trailer upward and across said tractor's fifth wheel as said engaging means contacts said top surface of said fifth wheel.

12. A method for engaging an anti-coupling device to a semi-trailer as claimed in claim 11 further comprising activating said engaging means from a passive position to an active position using a pneumatic valve system applying direct air pressure to activate said anti-coupling device within said semi-trailer.

13. A method for engaging an anti-coupling device to a semi-trailer as claimed in claim 12 further comprising activating said pneumatic valve system by manual activation, electronic activation or remote electronic activation.

14. A method for engaging an anti-coupling device to a semi-trailer as claimed in claim 13 wherein said engaging means is a half sphere having a curved end and a flat end adopted for mounting to said housing assembly, said half sphere contacting said fifth wheel in said active position.

15. A method for engaging an anti-coupling device to a semi-trailer as claimed in claim 14 further comprising moving said half sphere between said active and passive positions by a pressure means.

16. A method for engaging an anti-coupling device to a semi-trailer to prevent the coupling of a semi-trailer's kingpin to a tractor's fifth wheel comprising:
   (a) engaging a half sphere having a curved end and a flat end adopted for mounting within a housing assembly mounted within said semi-trailer within a specific radius of said kingpin using a diaphragm for engaging a pressure plate secured to said flat end of said half sphere;
   (b) activating said half sphere using a pneumatic system within said semi-trailer by manual activation, electronic activation or a remote activation, such that said half sphere moves from a passive position to an active position, thereby deflecting said semi-trailer upward and across said fifth wheel as said half sphere contacts said fifth wheel.

17. A method for engaging an anti-coupling device to a semi-trailer as claimed in claim 16 further comprising locking said half sphere into said active position by a locking means.

18. A method for engaging an anti-coupling device to a semi-trailer as claimed in claim 16 further comprising retaining said half sphere within said housing assembly in said passive position, a spring system or air pressure system.

19. A method for engaging an anti-coupling device to a semi-trailer as claimed in claim 15 further comprising floating said half sphere within said housing assembly by applying conical spring pressure.

\* \* \* \* \*